United States Patent
Kim et al.

(10) Patent No.: US 8,199,864 B1
(45) Date of Patent: Jun. 12, 2012

(54) QUADRATURE PHASE SHIFT KEYING DEMODULATOR OF DIGITAL BROADCAST RECEPTION SYSTEM AND DEMODULATION METHOD THEREOF

(75) Inventors: Min-ho Kim, Suwon-si (KR); Ki-dong Kang, Gwacheon-si (KR)

(73) Assignee: Samsung Electronics Co, Ltd., Suwon-Si, Gyeonggi-Do (KR)

( * ) Notice: Subject to any disclaimer, the term of this patent is extended or adjusted under 35 U.S.C. 154(b) by 1502 days.

(21) Appl. No.: 11/713,384

(22) Filed: Mar. 2, 2007

(51) Int. Cl.
*H04B 1/10* (2006.01)

(52) U.S. Cl. ........ 375/350; 375/281; 375/284; 375/319; 375/346; 455/285; 455/302

(58) Field of Classification Search .......... 375/259–261, 375/271, 279–281, 284–285, 316–319, 329–332, 375/346, 350; 455/285, 130, 269, 280, 283, 455/296, 302
See application file for complete search history.

(56) References Cited

U.S. PATENT DOCUMENTS

| | | | | |
|---|---|---|---|---|
| 2003/0186647 | A1* | 10/2003 | Ikeda .......................... | 455/3.02 |
| 2005/0123061 | A1* | 6/2005 | Smith et al. ................... | 375/261 |
| 2005/0254611 | A1* | 11/2005 | Liu et al. ....................... | 375/355 |
| 2007/0080835 | A1* | 4/2007 | Maeda et al. .................. | 341/120 |
| 2009/0286487 | A1* | 11/2009 | Rofougaran et al. ........... | 455/73 |

FOREIGN PATENT DOCUMENTS

| | | |
|---|---|---|
| KR | 20020096242 | 12/2002 |
| KR | 20020097293 | 12/2002 |
| KR | 20050038193 | 4/2005 |
| WO | WO 03090399 | 10/2003 |

OTHER PUBLICATIONS

English Abstract of Publication No. 1020020096242.
English Abstract of Publication No. 1020020097293.
English Abstract of Publication No. 1020050038193.

* cited by examiner

*Primary Examiner* — David C. Payne
*Assistant Examiner* — James M Perez
(74) *Attorney, Agent, or Firm* — F. Chau & Associates, LLC

(57) ABSTRACT

A demodulator for demodulating a digital broadcast signal and a demodulation method thereof. A QPSK demodulator of a digital broadcast reception system includes an in-phase/quadrature (I/Q) detector. The I/Q detector generates a baseband I signal and a baseband Q signal by multiplying a modulated QPSK signal by an I/Q carrier signal. A bandwidth adjustable first filter receives the baseband I signal and the baseband Q signal generated by the I/Q detector and rejects imaginary noise included in the received signals. A data restoration unit restores original data before the signals output from the first filter are QPSK modulated.

28 Claims, 13 Drawing Sheets

QUADRATURE PHASE SHIFT KEYING DEMODULATOR OF DIGITAL BROADCAST RECEPTION SYSTEM AND DEMODULATION METHOD THEREOF

BACKGROUND OF THE INVENTION

1. Technical Field

The present disclosure relates to a broadcast signal demodulation apparatus and method, and more particularly, to a quadrature phase shift keying demodulator of digital broadcast reception system and demodulation method thereof.

2. Description of the Related Art

Korean Patent Publication No. 2002-95741 relates to a technique of a Quadrature Phase Shift Keying (QPSK) demodulator for an open cable standard. Korean Patent Publication No. 1999-54384 relates to a QPSK demodulation technique where the time taken for a frequency offset to converge to 0 (zero) is reduced.

Digital broadcast transmission may utilize a Vestigial Side-Band (VSB) modulation method, a Quadrature Amplitude Modulation (QAM) method, or a QPSK modulation method, etc.

FIG. 1 illustrates frequency bands of a QAM modulated signal and a QPSK modulated signal in a single coaxial cable.

As illustrated in FIGS. 1, a 70 to 130 MHz frequency band is assigned to transmit digital broadcast data using a coaxial cable according to the QPSK modulation method. In addition, a QPSK demodulator is required to receive digital broadcast data in the 70 to 130 MHz frequency band. The QPSK modulation method is selected as a data transmission standard of the open cable standard.

According to the open cable standard, the QPSK demodulator demodulates data using an imaginary noise rejection filter, a matched filter, and an equalizer. Although the noise filtering circuit and the imaginary noise rejection circuit are embedded in the QPSK demodulator, the QPSK demodulator may not correctly demodulate data if data reception is poor.

If demodulation is correctly performed, the QPSK demodulator informs a host device of normal demodulation by generating a lock signal. However, because the lock signal is generated using only a mean square error (MSE) value, the lock signal may be unreliable.

SUMMARY OF THE INVENTION

Exemplary embodiments of the present invention provide a Quadrature Phase Shift Keying (QPSK) demodulator of a digital broadcast reception system that minimizes a decrease in demodulation performance even in a degraded data reception environment and a demodulation method thereof.

According to an aspect of the present disclosure, a QPSK demodulator of a digital broadcast reception system is provided. The QPSK demodulator includes an in-phase/quadrature (I/Q) detector generating a baseband I signal and a baseband Q signal by multiplying a modulated QPSK signal by an I/Q carrier signal. A bandwidth adjustable first filter receives the baseband I signal and the baseband Q signal generated by the I/Q detector and rejects imaginary noise included in the received signals. A data restoration unit restores original data before QPSK modulation is performed from the signals output from the first filter.

The I/Q detector may include an analog-to-digital converter (ADC) converting a modulated analog QPSK signal to a digital signal. A first Direct Current Removing Module (DCRM) removes a DC component included in the digital signal output from the ADC. A digital automatic gain controller (DAGC) maintains an entire signal level at the same rate by automatically adjusting a gain of a signal output from the first DCRM. An oscillator adjusts a frequency of the PQ carrier signal to a frequency offset value detected by the data restoration unit and generates an I/Q carrier signal having the adjusted frequency. An I/Q separator generates the baseband I signal and the baseband Q signal by multiplying a digital QPSK signal output from the DAGC by the I/Q carrier signal having the adjusted frequency.

The data restoration unit may include an interpolator receiving the signal output from the first filter and interpolating a value between samples. A matched filter receives a signal output from the interpolator and cancels interference and noise between symbols. A down sampler down-samples a signal output from the matched filter at a predetermined rate. A second DCRM removes a DC component of a signal output from the down sampler. A phase compensator receives a signal output from the second DCRM and compensates for phase errors of the I signal and the Q signal. An equalizer receives a signal output from the phase compensator and compensates for frequency and phase characteristics decrease due to a channel characteristic. A decoder receives a signal output from the equalizer and restores original data before QPSK modulation.

The QPSK demodulator may further include a lock signal generator. The lock signal generator determines whether the QPSK modulation is performed correctly by the I/Q detector and the data restoration unit and generates a lock signal when the QPSK modulation is performed correctly.

The lock signal generator may include a first lock signal generator. The first lock signal generator generates a first lock signal when a mean square error (MSE) value obtained from a first signal output from the data restoration unit is less than a first reference value and a power value of a second signal output from the data restoration unit is greater than a second reference value. A second lock signal generator calculates a sliding mean value of a difference between an absolute value of a third signal output from the data restoration unit and a delayed absolute value of the third signal. The second lock signal generator generates a second lock signal when an absolute value of the calculated sliding mean value is less than a third reference value. A third lock signal generator generates a third lock signal when a gain error signal of an automatic gain control processed by the I/Q detector is within a predetermined range. A logic circuit generates the lock signal when the first, second, and third lock signals are generated.

According to another aspect of the present disclosure, a QPSK demodulation method includes separately generating a baseband I signal and a baseband Q signal by multiplying a digitized intermediate frequency QPSK signal by an I/Q carrier signal. Imaginary noise included in the baseband I signal and the baseband Q signal that has been generated is rejected. A bandwidth adjustable first filter is used. Original data is restored before QPSK modulation from the I signal and the Q signal processed and the imaginary noise is rejected.

A frequency of the I/Q carrier signal may be adjusted to a frequency offset value detected in a data restoration process.

The step of restoring original data may include receiving the processed I signal and the Q signal and interpolating a value between samples. The interpolated signal is received and interference and noise between symbols are canceled. A sampling rate of the processed signal is changed. A DC component of the processed signal is removed. A phase error of the processed signal is compensated for. The processed signal is equalized. Original data is restored before QPSK modulation by decoding the processed signal.

The QPSK demodulation method may further include determining whether the QPSK modulation is performed correctly and generating a lock signal when the QPSK modulation is performed correctly.

The step of determining whether the QPSK modulation is performed correctly may further include generating a first lock signal when a mean square error (MSE) value obtained from a first signal generated in a demodulation process is less than a first reference value and a power value of a second signal generated in the demodulation process is greater than a second reference value. A sliding mean value of a difference between an absolute value of a third signal generated in the demodulation process and a delayed absolute value of the third signal is calculated and a second lock signal is generated when an absolute value of the calculated sliding mean value is less than a third reference value. A third lock signal is generated when a gain error signal of automatic gain control processed in the demodulation process is within a predetermined range. The lock signal is generated when the first, second, and third lock signals are generated.

BRIEF DESCRIPTION OF THE DRAWINGS

The above and other features of the present disclosure will become more apparent by describing in detail exemplary embodiments thereof with reference to the attached drawings in which.

DETAILED DESCRIPTION OF THE EXEMPLARY EMBODIMENTS

The attached drawings illustrate exemplary embodiments of the present invention and are referred to in order to gain a sufficient understanding of the present disclosure.

Hereinafter, exemplary embodiments of the present invention will be described in detail with reference to the attached drawings.

Figure 2:
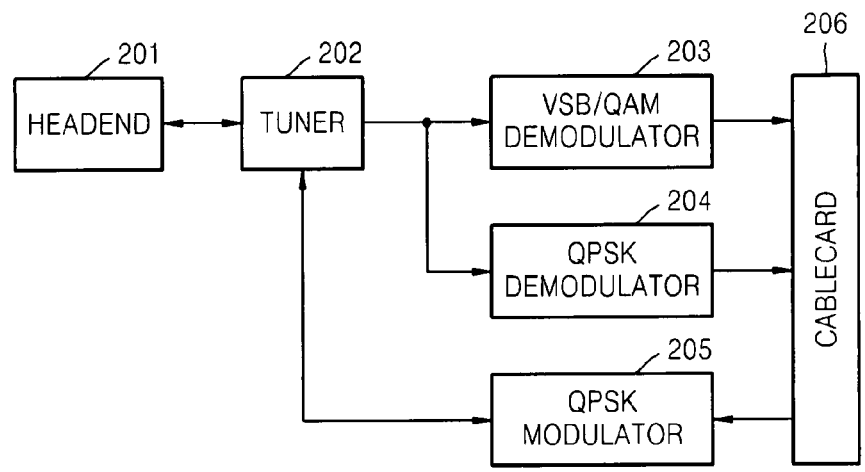
FIG. 2 is a schematic block diagram of an open cable transmission/reception system according to an exemplary embodiment of the present invention.

FIG. 2 is a schematic block diagram of an open cable transmission/reception system according to an exemplary embodiment of the present invention.

Referring to FIG. 2, the open cable transmission/reception system includes a headend 201, a tuner 202, a Vestigial Side-Band (VSB)/Quadrature Amplitude Modulation (QAM) demodulator 203, a Quadrature Phase Shift Keying (QPSK) demodulator 204, a QPSK modulator 205, and a cable card 206.

The headend 201 transmits and receives a wired TV broadcast signal through a cable. The tuner 202 converts a broadcast signal received in a frequency band of a selected channel to an intermediate frequency band and outputs the converted intermediate frequency band to the VSB/QAM demodulator 203 and the QPSK demodulator 204, and in the case of bi-directional data communication, transmits modulated data to the headend 201. The VSB/QAM demodulator 203 demodulates a VSB or QAM broadcast signal converted to the intermediate frequency band and outputs the demodulated VSB or QAM broadcast signal to the cable card 206. The QPSK demodulator 204 demodulates a QPSK broadcast signal converted to the intermediate frequency band and outputs the demodulated QPSK broadcast signal to the cable card 206. In particular, in the QPSK scheme, bi-directional data communication can be performed, and in this case, data received from the cable card 206 is modulated by the QPSK modulator 205 and transmitted to the headend 201 via the tuner 202.

Figure 3:
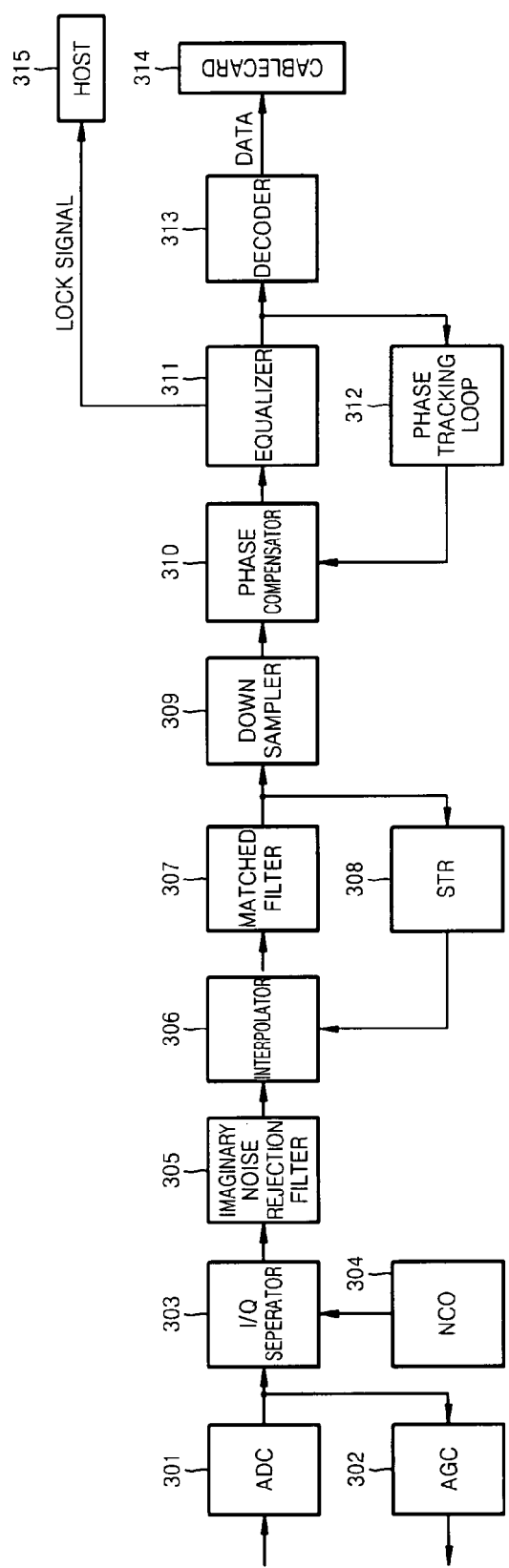
FIG. 3 is a schematic block diagram of a general QPSK demodulator related to an exemplary embodiment of the present invention.

FIG. 3 is a schematic block diagram of a general QPSK demodulator related to an exemplary embodiment of the present invention.

Referring to FIG. 3, the general QPSK demodulator includes an analog-to-digital converter (ADC) 301, an automatic gain controller (AGC) 302, an in-phase/quadrature (I/Q) separator 303, a numerically controlled oscillator (NCO) 304, an imaginary noise rejection filter 305, an interpolator 306, a matched filter 307, a Symbol Timing Recovery (STR) 308, a down sampler 309, a phase compensator 310, an equalizer 311, a phase tracking loop 312, a decoder 313, a cable card 314, and a host 315.

Figure 1:
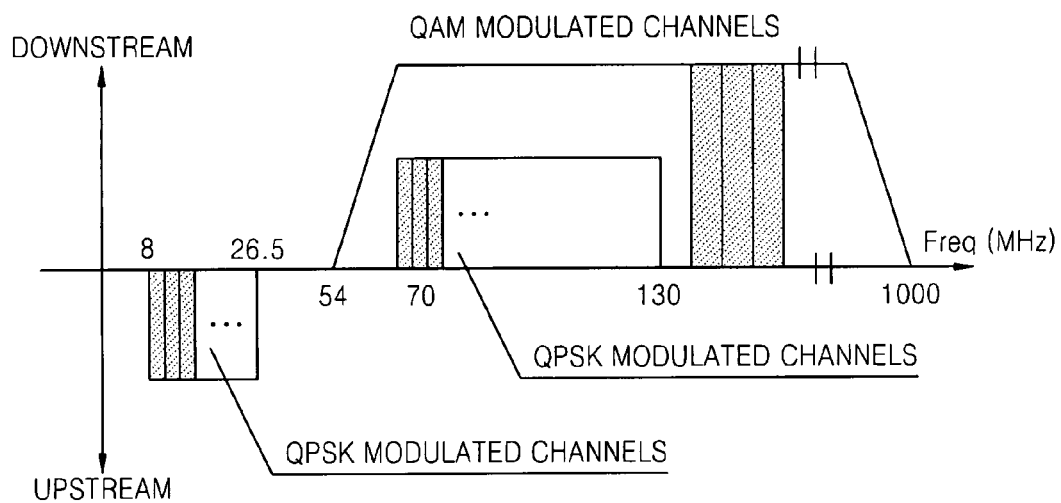
FIG. 1 illustrates frequency bands of a Quadrature Amplitude Modulation (QAM) modulated signal and a Quadrature Phase Shift Keying (QPSK) modulated signal on a single coaxial cable.

A QPSK signal converted to the intermediate frequency band by a tuner (referred to as tuner 202 in FIG. 1) is converted to a digital signal by the ADC 301. The AGC 302 controls a gain of the tuner by generating an AGC signal using the converted digital QPSK.

The I/Q separator 303 generates a baseband I signal and a baseband Q signal by multiplying an I/Q carrier signal, which is generated by the NCO 304, by the intermediate frequency band digital QPSK signal.

The imaginary noise rejection filter 305 removes an imaginary noise from the baseband I signal and the baseband Q signal received from the I/Q separator 303.

The interpolator 306 generates new samples through interpolation to reduce an error between samples of the baseband I signal and the baseband Q signal.

The interpolator 306 performs interpolation using a clock signal restored by the STR 308. The STR 308 restores the same clock signal as is used in the headend 201.

A signal to noise ratio of the interpolated I/Q signal is increased by canceling interference and noise between symbols using the matched filter 307. The I/Q signal is downsampled at a predetermined rate (e.g., ½) by the down sampler 309.

The phase compensator 310 compensates for phase errors of an I signal and a Q signal generated by the phase tracking loop 312. The equalizer 311 compensates for frequency and phase characteristics decrease due to a channel characteristic.

The decoder 313 restores original data before QPSK modulation is performed by decoding a signal output from the equalizer 311 and outputs the restored data to the cable card 314.

In addition, the equalizer 311 calculates a mean square error (MSE) value. If the MSE value is less than a reference value, the decoder 313 determines that demodulation has been performed correctly, generates a lock signal, and outputs the lock signal to the host 315. The host 315 determines whether the QPSK demodulator performed the demodulation correctly based on the lock signal input from the equalizer 311.

In the general QPSK demodulator, various performance problems may be attributable to cable broadcast reception conditions. Exemplary embodiments of the present invention minimize performance problems attributable cable broadcast reception conditions.

Figure 4:
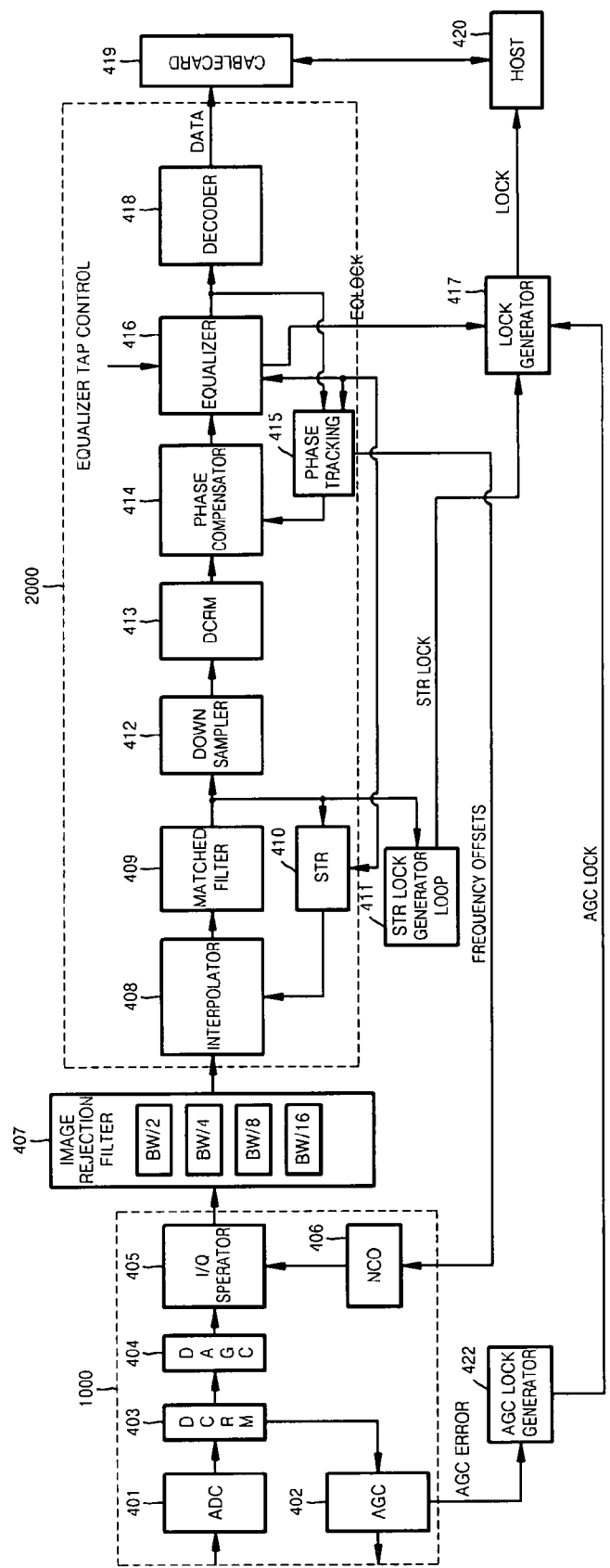
FIG. 4 is a schematic block diagram of a digital broadcast reception system having a QPSK demodulator applied thereto according to an exemplary embodiment of the present invention.

FIG. 4 is a schematic block diagram of a digital broadcast reception system having a QPSK demodulator applied thereto according to an exemplary embodiment of the present invention.

Referring to FIG. 4, the digital broadcast reception system having the QPSK demodulator applied thereto includes an ADC 401, an AGC 402, Direct Current Removing Modules (DCRMs) 403 and 413, a digital AGC (DAGC) 404, an I/Q separator 405, an NCO 406, an imaginary noise rejection filter 407, an interpolator 408, a matched filter 409, an STR 410, an STR lock generator loop 411, a down sampler 412, a phase compensator 414, a phase tracking loop 415, an equalizer 416, a lock generator 417, a decoder 418, a cable card 419, a host 420 and an AGC lock generator 422.

According to the present exemplary embodiment, a block including the ADC 401, the AGC 402; the DCRM 403, the DAGC 404, the I/Q separator 405, and the NCO 406 is referred to as an I/Q signal detector 1000. A block including the interpolator 408, the matched filter 409, the STR 410, the down sampler 412, the DCRM 413, the phase compensator 414, the phase tracking loop 415, the equalizer 416, and the decoder 418 is referred to as a data restoration unit 2000.

The present exemplary embodiment will now be described according to its differences from the general QPSK demodulator illustrated in FIG. 3. Features not specifically described herein may be similar to corresponding features of the general QPSK demodulator illustrated in FIG. 3.

When an undesired imaginary signal is generated in a frequency band of a signal input to the QPSK demodulator, the performance of the digital broadcast reception system may substantially decrease. Conventional imaginary noise rejection filters, such as used in the general QPSK demodulator illustrated in FIG. 3, are designed as a filter having a single fixed bandwidth. Accordingly, a change of a symbol rate causes a decrease in performance.

In contrast, the imaginary noise rejection filter 407 used in an exemplary embodiment of the present invention can vary a bandwidth and may be able to handle a change of a symbol rate with little or no decrease in performance.

Figure 6A:
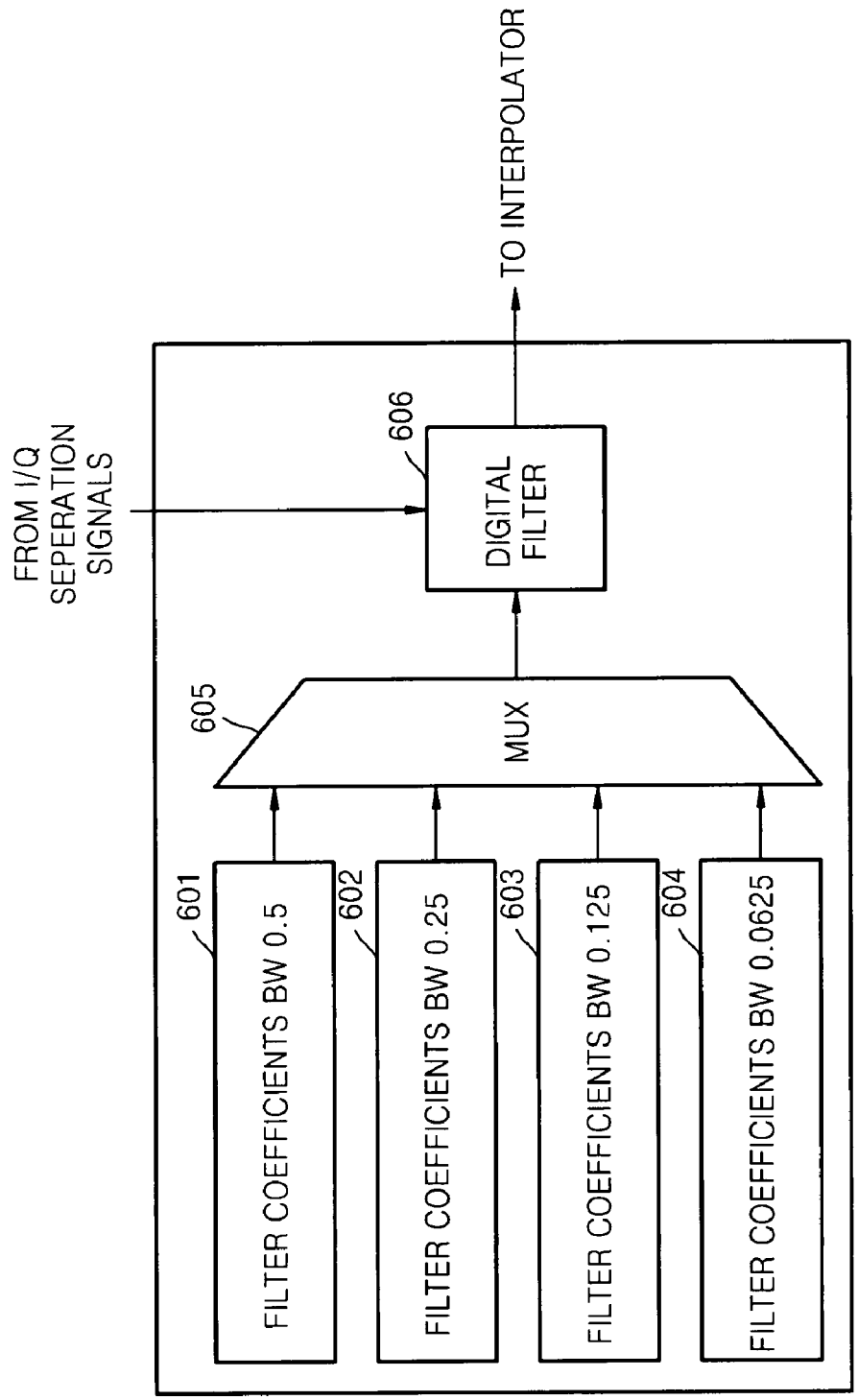
FIG. 6A is a schematic block diagram of an imaginary noise rejection filter according to an exemplary embodiment of the present invention.

FIG. 6A is a schematic block diagram of the imaginary noise rejection filter 407 of FIG. 4 according to an exemplary embodiment of the present invention.

Referring to FIG. 6A, the imaginary noise rejection filter 407 sets and stores four filter coefficients 601 through 604 corresponding to four bandwidths, for example, ½, ¼, ⅛, and 1/16 of an input sampling frequency. If an optimal bandwidth that is to be used for rejecting an imaginary signal is selected from among the four bandwidths. Filter coefficient values set in a digital filter 606 are updated using filter coefficient values corresponding to the selected bandwidth, which are input through a multiplexer 605. Accordingly, a bandwidth of the imaginary noise rejection filter 407 can be adjusted to a bandwidth in which the imaginary signal exists.

Figure 6B:
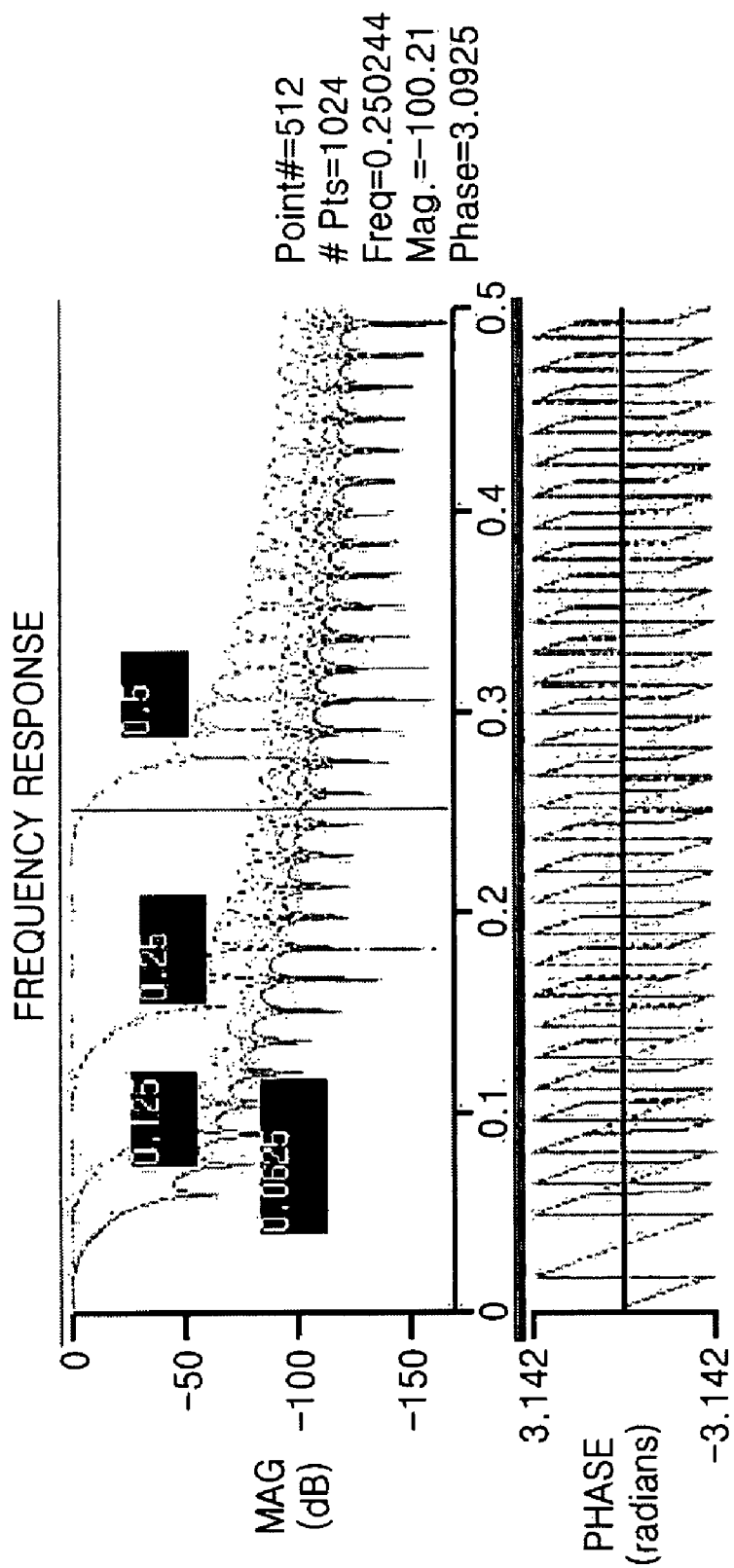
FIG. 6B illustrates frequency response characteristics of a bandwidth adjustable imaginary noise rejection filter adjusting multiple bandwidths including ½, ¼, ⅛, and 1/16 of an input sampling frequency, according to an exemplary embodiment of the present invention.

FIG. 6B illustrates frequency response characteristics of the imaginary noise rejection filter 407 for four bandwidths, for example, ½, ¼, ⅛, and 1/16 of an input sampling frequency, according to an exemplary embodiment of the present invention.

When a symbol rate of input data is low, the effect of the frequency offset is more significant. For example, since an occupied bandwidth is +/−0.386 MHz when the symbol rate is 0.772 Msps, if the frequency offset is greater than 100 KHz, the QPSK demodulator may have difficulty operating.

According to an exemplary embodiment of the present invention, instead of a frequency offset of an input signal being processed in a baseband, a frequency of an I/Q carrier signal is adjusted by reflecting a frequency offset detected by the phase tracking loop 415 on the NCO 406.

Figure 5:
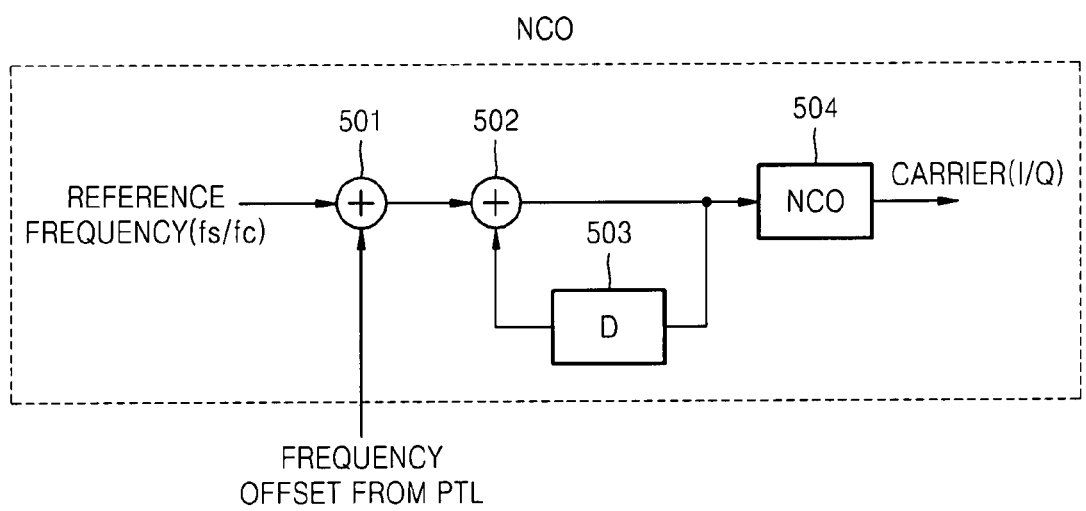
FIG. 5 is a circuit configuration adjusting a frequency of an in-phase/quadrature (I/Q) carrier signal by reflecting a frequency offset in a numerically controlled oscillator (NCO) according to an exemplary embodiment of the present invention.

FIG. 5 is a circuit configuration for adjusting a frequency of an I/Q carrier signal by reflecting a frequency offset in the NCO 406 according to an exemplary embodiment of the present invention.

Referring to FIG. 5, a reference frequency $f_s/f_c$ of the I/Q carrier signal and a frequency offset detected by the phase tracking loop 415 are added by an adder 501, accumulatively calculated by an adder 502 and a delay 503, and input to an NCO 504. Accordingly, the NCO 504 generates an I/Q carrier signal having a frequency compensated by the offset frequency.

Accordingly, the decrease in the performance of the QPSK demodulator due to the frequency offset can be prevented.

When only an AGC controlling a gain of an external amplifier using a Pulse Width Modulation (PWM) signal is used, the amplitude of a signal after sampling is not constantly controlled in the digital domain, and thus, the performance of the QPSK demodulator may be affected.

According to exemplary embodiments of the present invention, however, an entire signal level can be controlled at the same rate by adding the DAGC 404, which constantly controls the amplitude of a signal after sampling in the digital domain, to the QPSK demodulator, and thus, performance of the QPSK demodulator may be unaffected. In addition, by adding the DAGC 404 to the QPSK demodulator, amplified levels of a signal and noise can be maintained at the same level.

Figure 7:
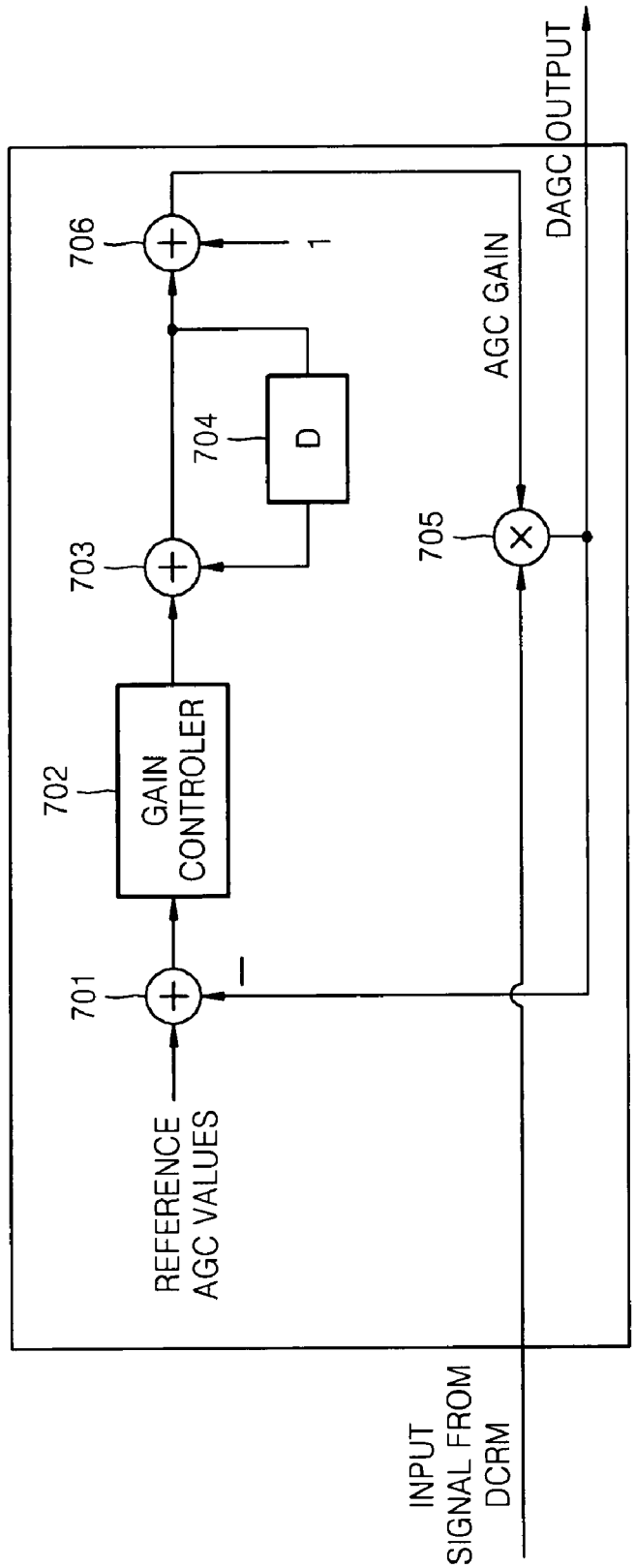
FIG. 7 is a schematic block diagram of a digital Automatic Gain Control (AGC) according to an exemplary embodiment of the present invention.

FIG. 7 is a schematic block diagram of the DAGC 404 according to an exemplary embodiment of the present invention.

Referring to FIG. 7, a subtractor 701 calculates the difference between a reference value and a value output from a multiplier 705. A gain controller 702 adjusts a gain using the value output from the subtractor 701. A value output from the gain controller 702 is accumulatively calculated by an adder 703 and a delay 704. "1" is added to the accumulatively calculated value by an adder 706 and the result is input to the multiplier 705. The multiplier 705 multiplies a signal input from the DCRM 403 by the signal output from the adder 706 and outputs the multiplication result to the I/Q separator 405. According to the present exemplary embodiment, an entire gain is controlled in the digital domain. Thus, a correct gain according to a change of an input signal can be estimated using the DAGC 404 as illustrated in FIG. 7.

When a DC component exists in a signal processed by the data restoration unit 2000, a reception rate may decrease due to a decrease in equalization performance.

According to an exemplary embodiment of the present invention, however, the DCRM 413 is added to the data restoration unit as well as the DCRM 403 used in the I/Q signal detector. The reception sensitivity is increased by removing a DC component which may exist in an input signal of the equalizer 416.

Figure 10:
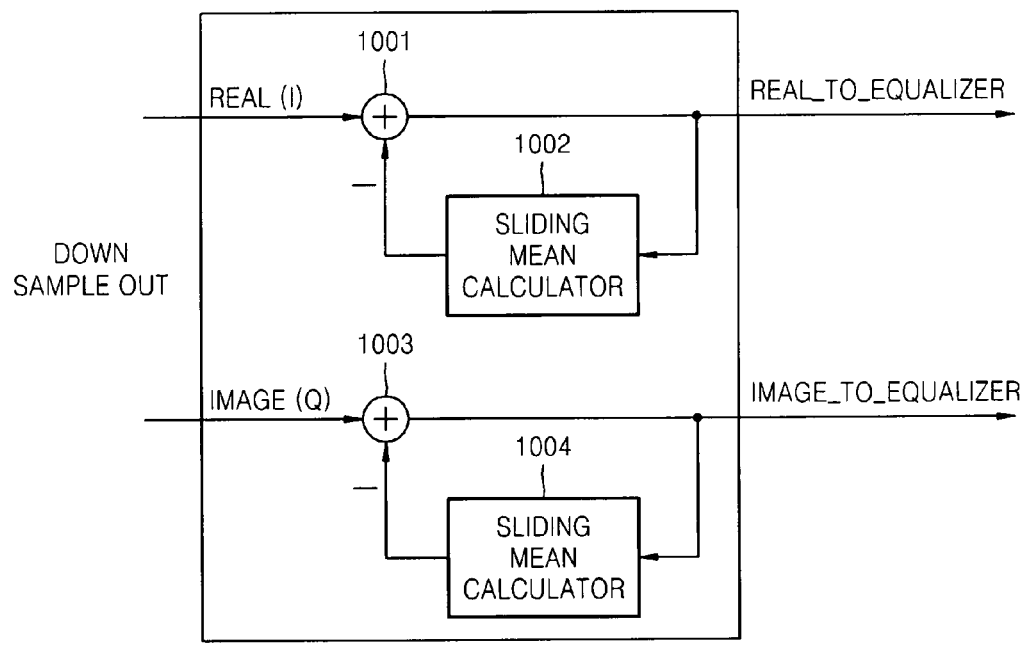
FIG. 10 is a schematic block diagram of a Direct Current Removing Module (DCRM) according to an exemplary embodiment of the present invention.

FIG. 10 is a schematic block diagram of the DCRM 403 or 413 according to an exemplary embodiment of the present invention.

Referring to FIG. 10, DC components of an I signal and a Q signal are removed by calculating sliding mean values of the I signal and the Q signal in sliding mean calculators 1002 and 1004 and subtracting the sliding mean values from input signals in subtractors 1001 and 1003, respectively.

Although the DCRM 413 is located at an input terminal of the phase compensator 414 in the embodiment illustrated in FIG. 4, the DCRM 413 can alternatively be located at an output terminal of the phase compensator 414. For example, the DCRM 413 added to the data restoration unit 2000 can be located in any location before the equalizer 416.

A lock signal is a signal for informing the host 420 that demodulation is performed correctly in the QPSK demodulator. Thus, when a reliable lock signal is not generated, a malfunction may occur in a signal processing process of the host 420.

Figure 11A:
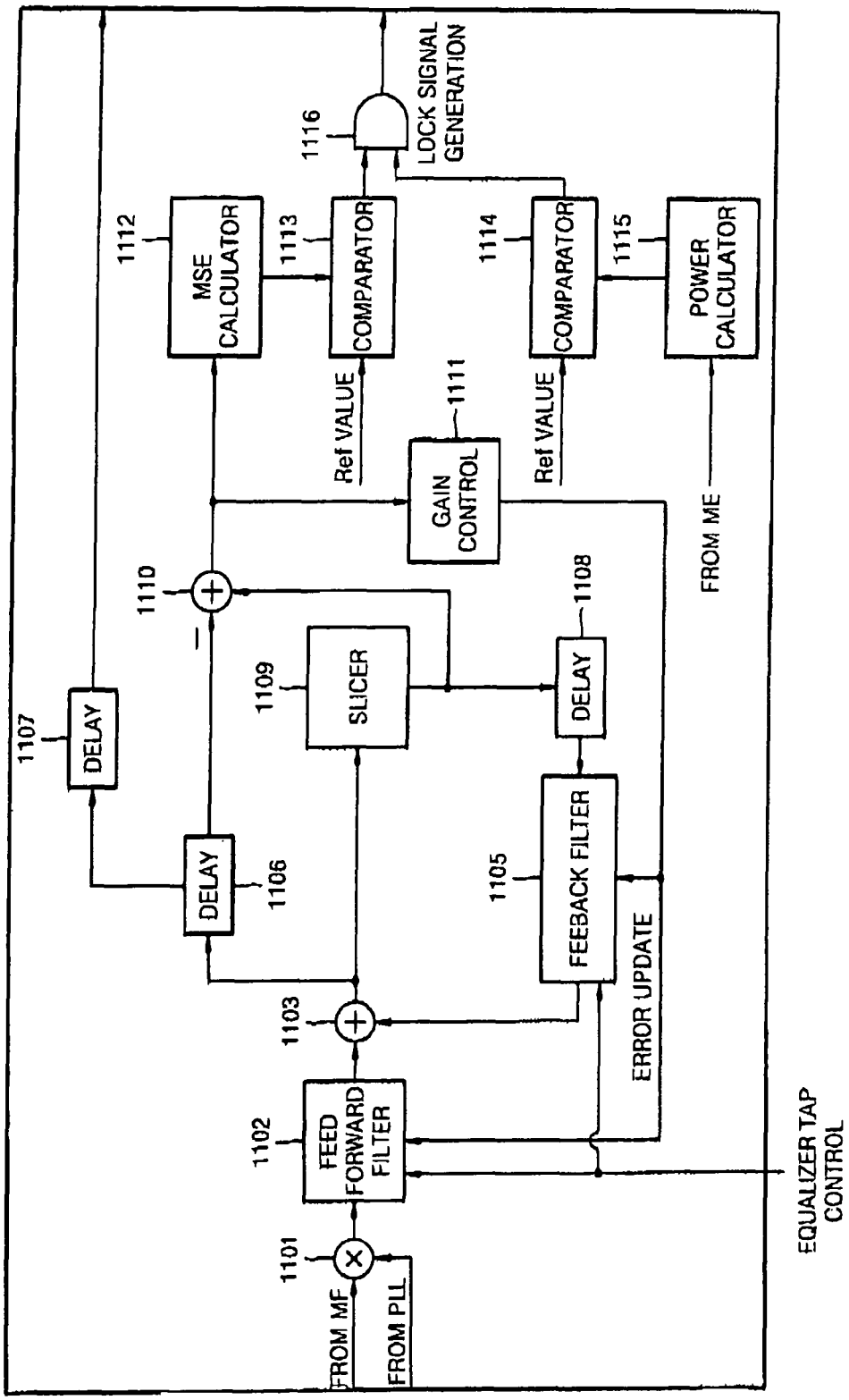
FIG. 11A is a schematic block diagram of an equalizer according to an exemplary embodiment of the present invention.

FIG. 11A is a schematic block diagram of the equalizer 416 of FIG. 4 according to an exemplary embodiment of the present invention.

Referring to FIG. 11A, the equalizer 416 includes a feedforward filter 1102, a slicer 1109, a feedback filter 1105, a gain controller 1111, an adder 1103, a subtractor 1110, a multiplier 1101, a plurality of delays 1106, 1107, and 1108, an MSE calculator 1112, a power calculator 1115, comparators 1113 and 1114, and an AND gate 1116.

A block including the feedforward filter 1102, the slicer 1109, the feedback filter 1105, the gain controller 1111, the adder 1103, the subtractor 1110, the multiplier 1101, and the plurality of delays 1106, 1107, and 1108 is described above in regard to a general equalizer circuit configuration and the present exemplary embodiment uses a similar block arrangement.

According to an exemplary embodiment of the present invention, a first lock signal is generated by adding a block including the MSE calculator 1112, the power calculator 1115, the comparators 1113 and 1114, and the AND gate 1116 to the equalizer 416.

The MSE calculator 1112 receives an error signal corresponding to a difference between an input and an output of the slicer 1109 and calculates an MSE value. For example, the MSE calculator 1112 calculates the MSE value by squaring the error signal output from the slicer 1109 and averaging the squared error signal.

The comparator 1113 compares the MSE value calculated by the MSE calculator 1112 to a first reference value and outputs a signal of a first logic level when the MSE value is less than the first reference value. The first logic level can be set to, for example, a high level according to a relationship with the AND gate 1116. The first reference value is a threshold for guaranteeing normal demodulation and can be set based on experiments performed at a design stage of the QPSK demodulator.

The power calculator 1115 calculates power by receiving a signal processed by the data restoration unit 2000. For example, the power calculator 1115 can calculate the power from an output signal obtained by passing the signal through the down sampler 412, the DCRM 413, and the phase compensator 414 after it is output from the matched filter 409.

The comparator 1114 compares the power value calculated by the power calculator 1115 to a second reference value and outputs a signal of the first logic level when the power value is less than the second reference value. The first logic level can be set to, for example, the high level according to a relationship with the AND gate 1116. The first reference value is the threshold for guaranteeing normal demodulation and can be determined at the design stage of the QPSK demodulator. The second reference value is a power threshold for guaranteeing normal demodulation and can be determined at the design stage of the QPSK demodulator.

The AND gate 1116 receives output signals of the comparators 1113 and 1114 and outputs the first lock signal (or an EQ lock signal) when both logic levels of the received signals are the first logic level.

As described above, in the present exemplary embodiment, the first lock signal is generated depending on both the MSE and power of the input signal. For example, the first lock signal is generated when the MSE is less than a reference error value and the power of the input signal is greater than a reference power value. Thus, according to the present exemplary embodiment, the correct lock signal is generated even when the amplitude of an input signal is low. For example, a more accurate lock signal can be generated by considering both an MSE and power of an input signal.

Figure 11B:
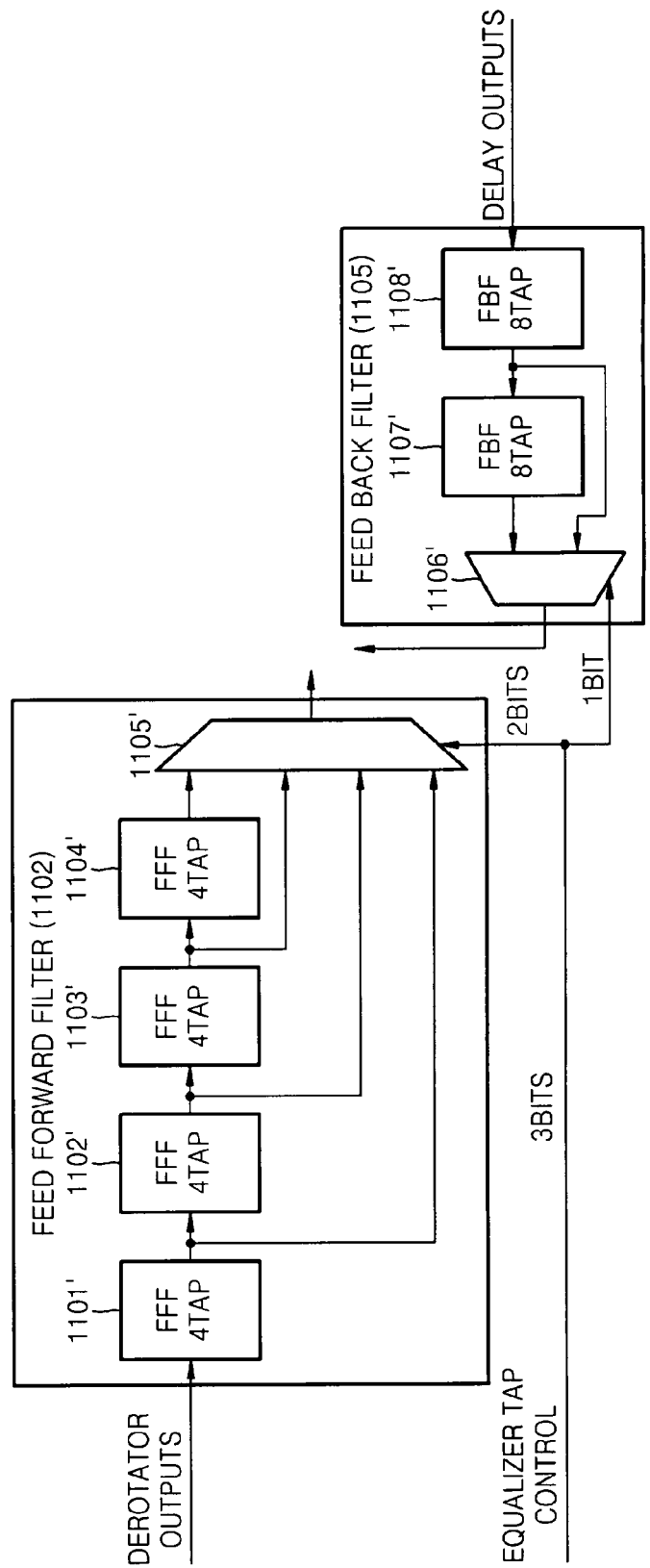
FIG. 11B is a schematic block diagram for describing the adjustment of a tap number of the equalizer illustrated in FIG. 11A, according to an exemplary embodiment of the present invention.

According to an exemplary embodiment of the present invention, the equalizer 416 can change a tap number thereof. For example, as illustrated in FIG. 11B, a tap number of the feedforward filter 1102 and a tap number of the feedback filter 1105 can be adjusted by a control signal.

According to an exemplary embodiment of the present invention, a second lock signal (or the STR lock signal) is generated by adding the STR lock generator 411 to the QPSK demodulator.

Figure 8:
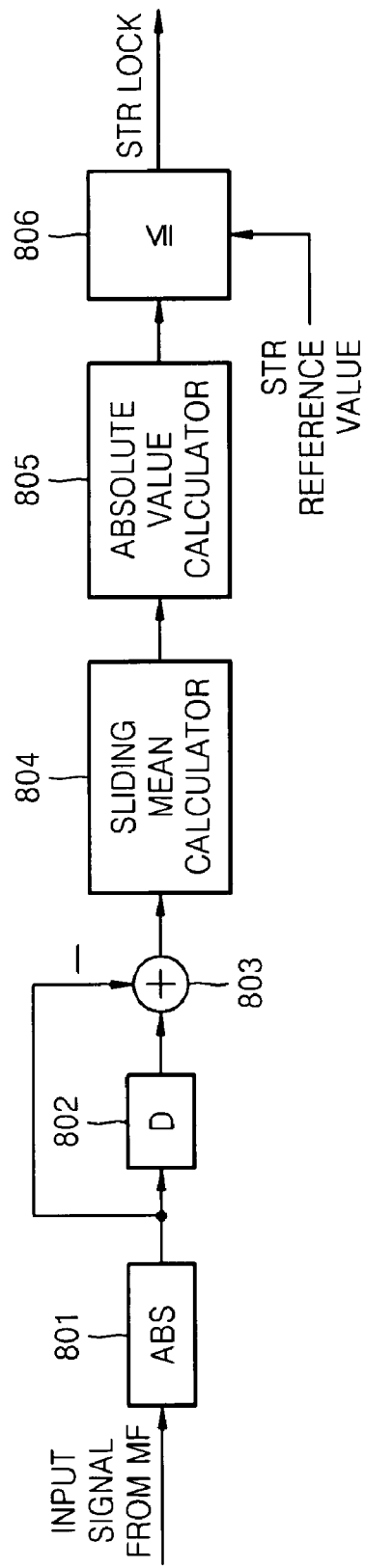
FIG. 8 is a schematic block diagram of a Symbol Timing Recovery (STR) lock generator according to an exemplary embodiment of the present invention.

FIG. 8 is a block diagram of the STR lock generator 411 according to an exemplary embodiment of the present invention.

Referring to FIG. 8, an absolute value of a signal output from the matched filter 409 is obtained by an absolute value calculator (ABS) 801. The difference between the absolute value delayed by a delay 802 and the absolute value output from the ABS 801 is calculated by a subtractor 803. The difference calculated by the subtractor 803 is input to a sliding mean calculator 804.

The sliding mean calculator 804 calculates a sliding mean value of the input signal and an absolute value calculator 805 calculates an absolute value of the sliding mean value calculated by the sliding mean calculator 804 and outputs the calculated absolute value to a comparator 806.

The comparator 806 compares the signal input from the absolute value calculator 805 to an STR reference value and generates the STR lock signal when the input signal is less than the STR reference value. The STR reference value is a threshold set at the design stage of the QPSK demodulator within a range that can guarantee that symbol timing recovery is performed normally.

According to an exemplary embodiment of the present invention, a third lock signal, for example, the AGC lock signal, is generated by adding the AGC lock generator 422 to the QPSK demodulator.

Figure 9:
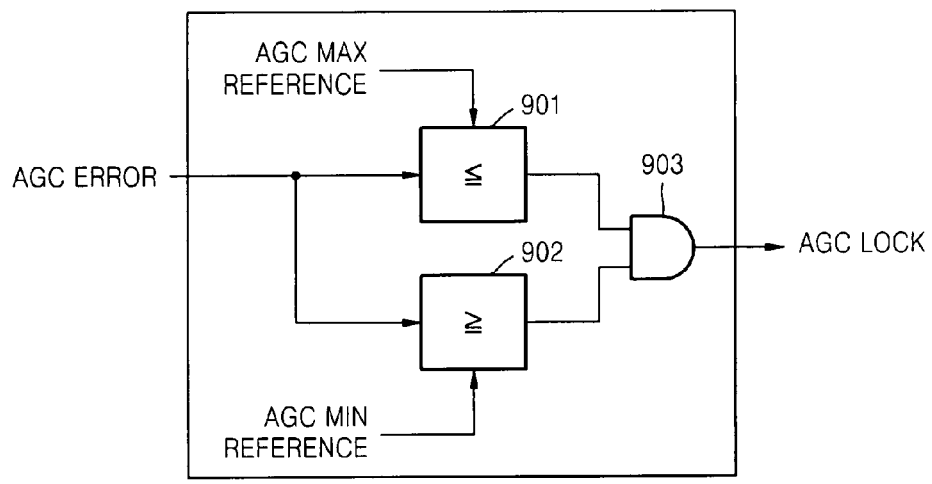
FIG. 9 is a schematic block diagram of an AGC lock generator according to an exemplary embodiment of the present invention.

FIG. 9 is a schematic block diagram of the AGC lock generator 422 according to an exemplary embodiment of the present invention.

Referring to FIG. 9, an AGC error generated by the AGC 402 is input and respectively compared to an AGC max reference value and an AGC min reference value by a comparator 901 and a comparator 902. The AGC max reference value and the AGC mint reference value are thresholds that can provide for normal demodulation and are determined at the design stage of the QPSK demodulator.

For example, the comparator 901 outputs a signal of the first logic level (e.g., the high level) when the AGC error is less than the AGC max reference value and the comparator 902 outputs a signal of the first logic level when the AGC error is greater than the AGC min reference value.

Thus, an AND gate 903 outputs the AGC lock signal having the high logic level when logic levels of both signals output from the comparator 901 and the comparator 902 are high levels.

According to an exemplary embodiment of the present invention, the robust lock signal is generated by adding the lock generator 417 to the QPSK demodulator.

Figure 12:
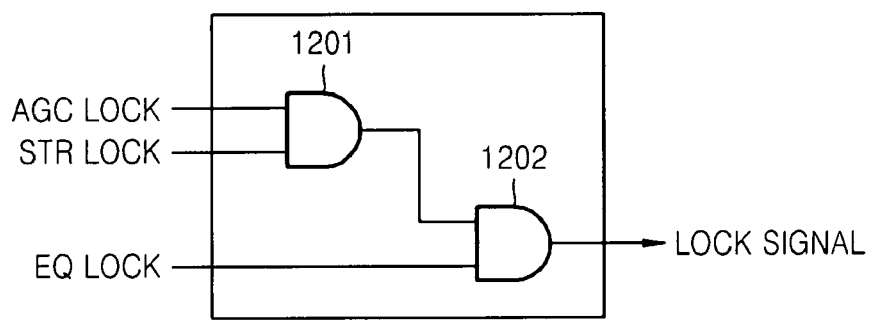
FIG. 12 is a schematic block diagram of a lock generator according to an exemplary embodiment of the present invention.

FIG. 12 is a schematic block diagram of the lock generator 417 according to an exemplary embodiment of the present invention.

Referring to FIG. 12, the lock signal is generated when all of the AGC lock signal, the STR lock signal, and the EQ lock signal described above have a logic value, for example, the high logic value, indicating correct demodulation.

For example, the lock signal is generated when the AGC lock signal, the STR lock signal, and the EQ lock signal input to AND gates 1201 and 1202 are all high levels.

Thus, a reliable lock signal can be generated. For example, a reliable lock signal can be generated even when a cable signal suddenly disappears, a signal varies slowly, or only a very small signal exists.

Figure 13:
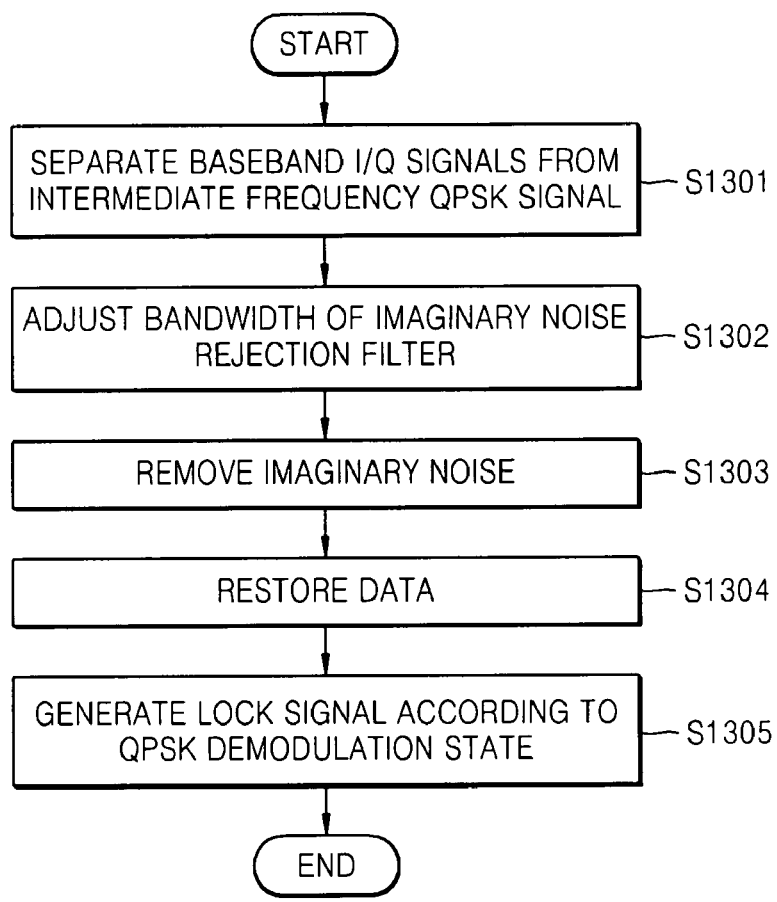
FIG. 13 is a flowchart illustrating a QPSK demodulation method of a digital broadcast reception system according to an exemplary embodiment of the present invention.

FIG. 13 is a flowchart illustrating a QPSK demodulation method of a digital broadcast reception system according to an exemplary embodiment of the present invention.

Referring to FIG. 13, baseband I and Q signals are separated from a digital converted QPSK signal having an intermediate frequency band, which is received by a QPSK demodulator, in operation S1301. For example, the separated baseband I and Q signals are generated by multiplying the digitized intermediate frequency QPSK signal by an I/Q carrier signal. In this case, the frequency of the I/Q carrier signal may be adjusted to a frequency offset value detected in a data restoration process.

In order to reject imaginary noise included in the baseband I and Q signals generated in operation S1301, a bandwidth of an imaginary noise rejection filter is adjusted in operation S1302. The imaginary noise rejection filter adjusts the bandwidth by having a plurality of bandwidths of $\frac{1}{2}^N$ of an input sampling frequency where N=1, 2, 3, . . . , and by selecting one of the plurality of bandwidths using a program.

The imaginary noise included in the baseband I and Q signals is rejected in operation S1303 using the imaginary noise rejection filter having a bandwidth that has been adjusted in operation S1302.

A signal processing process for restoring original data before QPSK demodulation of the I/Q signals obtained in operation S1303 is performed in operation S1304.

Figure 14:
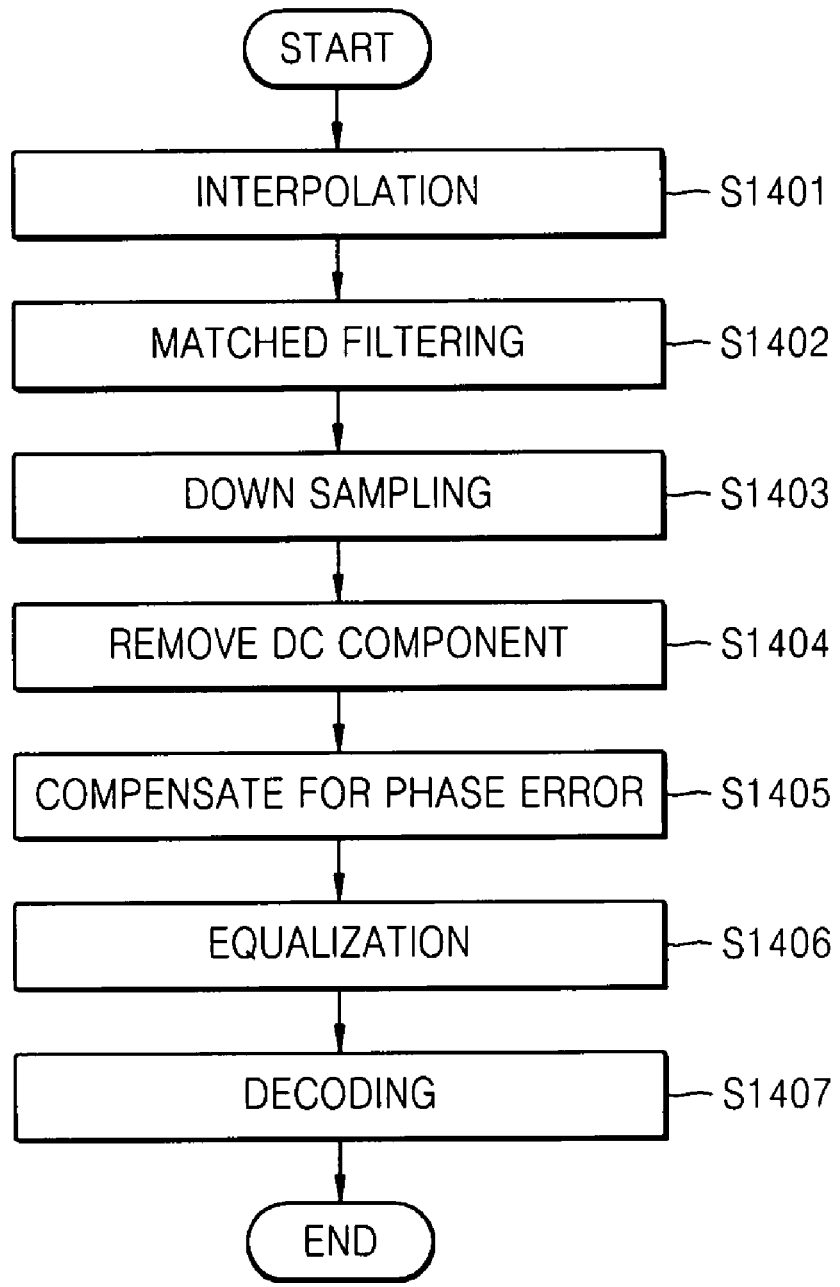
FIG. 14 is a flowchart illustrating a data restoration process illustrated in FIG. 13, according to an exemplary embodiment of the present invention.

FIG. 14 is a flowchart illustrating the data restoration process of operation S1304 illustrated in FIG. 13, according to an exemplary embodiment of the present invention.

Referring to FIG. 14, after receiving the I signal and the Q signal from which the imaginary noise is rejected, values between samples are generated by using interpolation in operation S1401. Signal processing for removing interference between symbols and noise by receiving the interpolated signal is performed in operation S1402. A sampling rate is changed in operation S1403 by down sampling the signal processed in operation S1402. For example, a sampling change rate can be set to ½ of down sampling.

A DC component of the signal changed in operation S1403 is removed in operation S1404. For example, the DC component can be removed by calculating a sliding mean value of an input signal and subtracting the sliding mean value from the input signal.

A phase error of the signal processed in operation S1404 is compensated for in operation S1405. The phase error compensated signal is equalized in operation S1406. Data is restored by decoding the equalized signal in operation S1407. The data can be restored before the QPSK modulation is performed by performing the data restoration process described above.

Referring back to FIG. 13, based on the data restoration process of operation S1304, it is determined whether QPSK demodulation is performed correctly and a robust lock signal is generated according to the determination result in operation S1305.

Exemplary embodiments of the present invention generate a robust lock signal by combining lock signals generated by a plurality of lock signal generators.

For example, first, second, and third lock signals are generated by performing a first operation for generating the first lock signal if an MSE value obtained from a first signal generated in a demodulation process is less than a first reference value and a power value of a second lock signal generated in the demodulation process is greater than a second reference value. A second operation for calculating a sliding mean value of a difference between an absolute value of a third signal generated in the demodulation process and a delayed absolute value of the third signal is performed. The second lock signal is generated if an absolute value of the calculated sliding mean value is less than a third reference value. A third operation for generating the third lock signal is performed when a gain control signal of AGC processed in the demodulation process is within a threshold range. Finally, a lock signal is generated when the first, second, and third lock signals are generated correctly.

An equalized signal may be used as the first signal, a signal before equalization is performed may be used as the second signal, and a signal matched filtered after interpolation is performed may be used as the third signal. The first, second, and third lock signals respectively correspond to the EQ lock signal, the STR lock signal, and the AGC lock signal.

The QPSK demodulator has been described with respect to exemplary embodiments of the present invention. The present invention is not limited thereto and exemplary embodiments of the present invention can be applied to other digital broadcast demodulators including a QAM demodulator. In addition, exemplary embodiments of the present invention can be applied to a cable QPSK demodulator and a satellite QPSK demodulator.

As described above, according to exemplary embodiments of the present invention, a decrease in the reception sensitivity due to an imaginary signal may be prevented. A decrease in the reception sensitivity due to a frequency offset may be prevented. A demodulator using digital gain adjustment may exhibit increased performance. A decrease in the performance of the demodulator due to a DC signal may be prevented. A robust lock signal for the demodulator may be generated, even when a data reception environment worsens. A decrease in demodulation performance can be minimized. A host can be prevented from wrongly determining a demodulation state by generating a highly reliable lock signal.

While exemplary embodiments of the present invention have been particularly shown and described with reference to the figures, it will be understood by those of ordinary skill in the art that various changes in form and details may be made therein without departing from the spirit and scope of the present invention.

What is claimed is:

1. A Quadrature Phase Shift Keying (QPSK) demodulator of a digital broadcast reception system, the QPSK demodulator comprising:
    an in-phase/quadrature (I/Q) detector generating a baseband I signal and a baseband Q signal by multiplying a modulated QPSK signal by an I/Q carrier signal, wherein the modulated QPSK signal has been generated by performing QPSK modulation on original data;
    a bandwidth adjustable first filter receiving the baseband I signal and the baseband Q signal generated by the I/Q detector, rejecting imaginary noise included in the received signals and outputting a filtered signal; and
    a data restoration unit restoring the original data from the filtered signal output from the bandwidth adjustable first filter,
    wherein the I/Q detector comprises:
    an analog-to-digital converter (ADC) converting a modulated analog QPSK signal to a digital QPSK signal and outputting the digital QPSK signal;
    a first Direct Current Removing Module (DCRM) removing a DC component from the digital QPSK signal output from the ADC and outputting the DC-removed digital QPSK signal;
    a digital automatic gain controller (DAGC) maintaining a signal level of the DC-removed digital QPSK signal at a constant rate by automatically adjusting a gain of the DC-removed digital QPSK signal output from the first DCRM and outputting a gain-adjusted digital QPSK signal;
    an oscillator adjusting a frequency of the I/Q carrier signal to a frequency offset value detected by the data restoration unit and generating an I/Q carrier signal having the adjusted frequency; and
    an I/Q separator generating the baseband I signal and the baseband Q signal by multiplying the gain-adjusted digital QPSK signal output from the DAGC by the I/Q carrier signal having the adjusted frequency.

2. The QPSK demodulator of claim 1, wherein the oscillator comprises a numerically controlled oscillator (NCO).

3. The QPSK demodulator of claim 1, wherein a bandwidth of the first filter is adjusted according to a selection of filter coefficients.

4. The QPSK demodulator of claim 1, wherein the bandwidth adjustable first filter uses a bandwidth selected from among a plurality of bandwidths of an input sampling frequency, the plurality of bandwidths represented by $\frac{1}{2}^N$ where N is a set of positive integers.

5. The QPSK demodulator of claim 1, wherein the data restoration unit comprises:
    an interpolator receiving the filtered signal output from the bandwidth adjustable first filter and interpolating a value between samples;
    a matched filter receiving a signal output from the interpolator and canceling interference and noise between symbols;
    a down sampler down sampling a signal output from the matched filter at a predetermined rate;
    a second DCRM removing a DC component of a signal output from the down sampler;
    a phase compensator receiving a signal output from the second DCRM and compensating for phase errors of the I signal and the Q signal;
    an equalizer receiving a signal output from the phase compensator and compensating for frequency and phase characteristics decrease due to a channel characteristic; and
    a decoder receiving a signal output from the equalizer and restoring the original data.

6. The QPSK demodulator of claim 5, wherein the second DCRM removes a DC component of each of the I signal and the Q signal.

7. The QPSK demodulator of claim 5, wherein the second DCRM comprises:
    a first sliding mean calculator calculating a first sliding mean value of the I signal output from the down sampler;
    a first subtractor subtracting the first sliding mean value from the I signal output from the down sampler;
    a second sliding mean calculator calculating a second sliding mean value of the Q signal output from the down sampler; and
    a second subtractor subtracting the second sliding mean value from the Q signal output from the down sampler.

8. The QPSK demodulator of claim 1, further comprising a lock signal generator determining whether the QPSK demodulation has been performed correctly and generating a lock signal when the QPSK demodulation has been performed correctly.

9. The QPSK demodulator of claim 8, wherein the lock signal generator generates a lock signal by combining lock signals generated by a plurality of lock signal generation circuits.

10. The QPSK demodulator of claim 9, wherein the plurality of lock signal generation circuits comprises a first lock generator generating a first lock signal when a mean square error (MSE) value obtained from a first signal output from the data restoration unit is less than a first reference value and a power value of a second signal output from the data restoration unit is greater than a second reference value.

11. The QPSK demodulator of claim 9, wherein the plurality of lock signal generation circuits comprises a second lock signal generator calculating a sliding mean value of a difference between an absolute value of a third signal output from the data restoration unit and a delayed absolute value of the third signal and generating a second lock signal when an absolute value of the calculated sliding mean value is less than a third reference value.

12. The QPSK demodulator of claim 9, wherein the plurality of lock signal generation circuits comprises a third lock signal generator generating a third lock signal when a gain error signal of an automatic gain control processed by the I/Q detector is within a predetermined range.

13. The QPSK demodulator of claim 8, wherein the lock signal generator comprises:
   a first lock signal generator generating a first lock signal when an MSE value obtained from a first signal output from the data restoration unit is less than a first reference value and a power value of a second signal output from the data restoration unit is greater than a second reference value;
   a second lock signal generator calculating a sliding mean value of a difference between an absolute value of a third signal output from the data restoration unit and a delayed absolute value of the third signal and generating a second lock signal when an absolute value of the calculated sliding mean value is less than a third reference value;
   a third lock signal generator generating a third lock signal when a gain error signal of an automatic gain control processed by the I/Q detector is within a predetermined range; and
   a logic circuit generating the lock signal when the first, second, and third lock signals are generated.

14. The QPSK demodulator of claim 13, wherein the logic circuit comprises a logic AND gate.

15. The QPSK demodulator of claim 13, wherein the first signal comprises an equalized signal.

16. The QPSK demodulator of claim 13, wherein the second signal comprises a signal that has not been equalized.

17. The QPSK demodulator of claim 13, wherein the third signal comprises a signal that has been interpolated and match-filtered.

18. A method for Quadrature Phase Shift Keying (QPSK) demodulation comprising:
   separately generating a baseband I signal and a baseband Q signal by multiplying a digitized intermediate frequency QPSK signal by an I/Q carrier signal, wherein the digitized intermediate frequency QPSK signal been generated by performing QPSK modulation on original data;
   rejecting imaginary noise from the generated baseband I signal and the generated baseband Q signal using a bandwidth adjustable first filter; and
   restoring the original data from the imaginary noise-rejected I signal and the Q signal,
   wherein the step of restoring the original data comprises:
   receiving the noise-rejected I signal and the Q signal and interpolating a value between samples;
   receiving the interpolated signal and canceling interference and noise between symbols;
   changing a sampling rate of the interference and noise-canceled signal;
   removing a DC component of the sampling rate-changed signal;
   compensating for a phase error of the DC component-removed signal;
   equalizing the compensated signal; and
   restoring the original data by decoding the equalized signal.

19. The QPSK demodulation method of claim 18, wherein a frequency of the I/Q carrier signal is adjusted to a frequency offset value detected in a data restoration process.

20. The QPSK demodulation method of claim 18, wherein the bandwidth adjustable first filter uses a bandwidth selected from among a plurality of bandwidths of an input sampling frequency using a program, the plurality of bandwidths represented by $1/2^N$ where N is a set of positive integers.

21. The QPSK demodulation method of claim 18, wherein the step of removing the DC component comprises:
   calculating a sliding mean value of the sampling rate-changed signal; and
   subtracting the sliding mean value from the sampling rate-changed signal.

22. The QPSK demodulation method of claim 18, wherein the sampling rate comprises ½ down sampling.

23. The QPSK demodulation method of claim 18, further comprising determining whether the QPSK demodulation has been performed correctly and generating a lock signal when the QPSK demodulation has been performed correctly.

24. The QPSK demodulation method of claim 23, wherein the lock signal is generated by combining lock signals generated in a plurality of lock signal generation processes.

25. A method for Quadrature Phase Shift Keying (QPSK) demodulation comprising:
   separately generating a baseband I signal and a baseband Q signal by multiplying a digitized intermediate frequency QPSK signal by an I/Q carrier signal, wherein the digitized intermediate frequency QPSK signal been generated by performing QPSK modulation on original data;
   rejecting imaginary noise from the generated baseband I signal and the generated baseband Q signal using a bandwidth adjustable first filter;
   restoring the original data from the imaginary noise-rejected I signal and the Q signal; and
   determining whether the QPSK demodulation has been performed correctly and generating a lock signal when the QPSK demodulation has been performed correctly,
   wherein the step of determining whether the QPSK demodulation has been performed correctly comprises:
   generating a first lock signal when a mean square error (MSE) value obtained from a first signal generated in a demodulation process is less than a first reference value and a power value of a second signal generated in the demodulation process is greater than a second reference value;
   calculating a sliding mean value of a difference between an absolute value of a third signal generated in the demodulation process and a delayed absolute value of the third signal and generating a second lock signal when an absolute value of the calculated sliding mean value is less than a third reference value;
   generating a third lock signal when a gain error signal of an automatic gain control processed in the demodulation process is within a predetermined range; and
   generating the lock signal when the first, second, and third lock signals are generated.

26. The QPSK demodulation method of claim 25, wherein the first signal comprises an equalized signal.

27. The QPSK demodulation method of claim 25, wherein the second signal comprises a signal that has not yet been equalized.

28. The QPSK demodulation method of claim 25, wherein the third signal comprises a signal that has been interpolated and match-filtered.

* * * * *